United States Patent [19]
Hopfe

[11] Patent Number: 6,077,374
[45] Date of Patent: Jun. 20, 2000

[54] METHOD OF PREPARING PRELAMINATE USING ROUGH-SURFACED INTERLAYER

[75] Inventor: Harold Herbert Hopfe, Longmeadow, Mass.

[73] Assignee: Monsanto, St. Louis, Mo.

[21] Appl. No.: 08/106,742

[22] Filed: Aug. 16, 1993

[51] Int. Cl.$^7$ .................................................. B32B 31/00
[52] U.S. Cl. ......................... 156/102; 156/104; 156/106; 428/141; 428/156
[58] Field of Search .............................. 156/99, 102, 104, 156/106, 306.6; 264/284, 293; 428/141, 156

[56] References Cited

U.S. PATENT DOCUMENTS

| | | | |
|---|---|---|---|
| 2,904,844 | 9/1959 | Smithies | 264/211 |
| 2,909,810 | 10/1959 | Jensch | 264/284 |
| 3,591,406 | 7/1971 | Moynihan | 156/106 X |
| 3,994,654 | 11/1976 | Chyu | 425/376 |
| 4,035,549 | 7/1977 | Kennar | 428/409 |
| 4,316,868 | 2/1982 | Esposito et al. | 264/171 |
| 4,452,840 | 6/1984 | Sato et al. | 428/156 |
| 4,575,540 | 3/1986 | Cartier | 525/328.7 |
| 4,654,179 | 3/1987 | Cartier et al. | 264/176.1 |
| 4,671,913 | 6/1987 | Gen et al. | 264/171 |
| 4,925,725 | 5/1990 | Endo et al. | 428/156 |
| 5,091,258 | 2/1992 | Moran | 428/141 X |
| 5,151,234 | 9/1992 | Ishihara et al. | 264/176.1 |

*Primary Examiner*—Francis J. Lorin
*Attorney, Agent, or Firm*—Michael J. Murphy

[57] ABSTRACT

A method of preparing a prelaminate for a safety glazing which involves providing a thermoplastic interlayer having a first air removal surface which includes a multiplicity of microscopic embossments of substantially identical shape integrally projecting from the plane of one side of the interlayer in a regular pattern of rows and a second air removal surface on the other side of the interlayer which is different from the first air removal surface and includes a multiplicity of microscopic peaks and valleys of varying heights and depths arranged in an irregular, non-linear pattern, interposing the interlayer between two layers of glass and deairing the interfaces with the glass layers during which the first air removal surface is partially transferred to and imposed on the second air removal surface to provide deair paths of reduced obstruction.

2 Claims, 2 Drawing Sheets

METHOD OF PREPARING PRELAMINATE USING ROUGH-SURFACED INTERLAYER

BACKGROUND OF THE INVENTION

This invention relates to thermoplastic interlayer having rough surfaces and more particularly to a particular form of rough surface for optimum deairing in a prelaminate with glass.

Plastic sheet, typically of polyvinyl butyral (PVB), is known as an interlayer for use with optically transparent glass in laminated safety glass assemblies used, for example, in vehicle windshields, building windows and the like.

It is further known, (see, for example, U.S. Pat. No. 4,035,549, to Kennar) to make the surface of the sheet rough to facilitate deairing, i.e. evacuating air from an interface between the sheet and a glass layer during preparation of a prelaminate of the sheet with glass. More specifically, minute channels between the smooth surface of the glass and the rough surface of the opposing contiguous sheet form routes for air to escape from between the two members when pressure or vacuum is applied with heat during preparation of the prelaminate. The deaired prelaminate is then subjected to elevated temperature and pressure bonding conditions, usually in a downstream autoclave, to form the finished safety glass assembly.

Inadequate deairing results in visual defects in the finished safety glass assembly in the form of undesirable bubbles or local unlaminated regions. Deair completeness is conveniently measured by light transmission through the prelaminate before final laminating in the autoclave. The greater such transmission, the greater the quality of deairing provided by A particular profile of rough surface.

Optimum deairing is a continuing need in the laminated safety glass art.

SUMMARY OF THE INVENTION

Now, improvements have been made in interlayer surface roughness which increase the quality of prelaminates formed therewith.

Accordingly, a principal object of this invention is to provide an interlayer with a particular roughness profile which optimizes deairing during preparation of a prelaminate for use in a safety glass assembly.

Another object is to provide a prelaminate of high quality as determined by a remarkably high degree of light transmission therethrough.

Other objects will in part be obvious and will in part appear from the following detailed description and claims.

These and other objects are accomplished by a thermoplastic interlayer having a first air removal surface on one side comprising a multiplicity of microscopic embossments of substantially identical shape integrally projecting from the plane of one side of the interlayer in a regular pattern of mutually perpendicular rows and a second air removal surface on the other side which is different from the first air removal surface, comprising a multiplicity of microscopic peaks and valleys of varying heights and depths arranged in an irregular, non-linear pattern, the average roughness height, $R_z$, of the embossments and peaks being less than about fifty microns and the average distance, $S_m$, between the embossments and the peaks being less than about 300 microns, such interlayer in a prelaminate with each side press-bonded bonded to a layer of glass being capable of transmitting at least 85% of incident light.

Also provided in the method of preparing a prelaminate for a safety glazing by deairing the interface with glass on each rough-surfaced side of a thermoplastic interlayer and heating the interlayer and glass to collapse the rough surfaces, is the improvement facilitating deairing wherein a regular roughness pattern on one side of the interlayer is partially transferred to and imposed on a random roughness pattern on the other side of the interlayer to provide deair paths which are less obstructed than those of the unmodified random pattern.

In a more specific aspect, a method is provided for preparing a prelaminate for a safety glazing which comprises:

a) providing a thermoplastic interlayer having:
   (i) a first air removal surface on one side comprising a multiplicity of microscopic embossments of substantially identical shape integrally projecting from the plane of one side of the interlayer in a regular pattern of mutually perpendicular rows; and
   (ii) a second air removal surface on the other side which is different from the first air removal surface comprising a multiplicity of microscopic peaks and valleys of varying heights and depths arranged in an irregular, non-linear pattern;

b) interposing the interlayer between two layers of glass;

c) increasing the temperature of the interlayer between the glass layers to above the glass transition temperature of the thermoplastic;

d) developing a negative pressure on the assembly of c) to draw air from the interface between one glass sheet and the first air removal surface at a rate greater than occurring at the interface between the other glass sheet and the second air removal surface;

e) partially collapsing embossments of the first air removal surface to cause the regular pattern to at least partially transfer to and modify the second air removal surface thereby facilitating air removal from the interface of the modified second air removal surface through channels formed by the transferred regular pattern; and then f) increasing the temperature of the assembly of e) to substantially completely collapse the embossments and peaks of the first and modified second air removal surfaces to provide the prelaminate.

Further provided is a prelaminate producible by the methods noted above which is capable of transmitting at least 85%, and even as much as 95% or more, of light incident thereon.

BRIEF DESCRIPTION OF THE DRAWINGS

In describing the overall invention, reference will be made to the accompanying drawings wherein.

DETAILED DESCRIPTION OF THE INVENTION

Thermoplastic interlayer usable in the invention must be capable of strongly bonding to a rigid panel such as glass to form an impact-dissipating layer in a laminated safety glass assembly. Exemplary thermoplastics include poly(ethylene-vinyl acetate), poly(ethylene-vinyl acetate-vinyl alcohol), poly(ethylene-methyl methacrylate-acrylic acid), polyurethane, plasticized polyvinyl chloride, etc. Polyvinyl butyral (PVB) and more particularly partial PVB containing about 10 to 30 weight % hydroxyl groups expressed as polyvinyl alcohol is preferred. Such partial PVB further comprises about 0 to 2.5 weight % acetate expressed as polyvinyl acetate with the balance being butyral expressed as polyvinyl butyral. The non-critical thickness of the thermoplastic sheet can vary and is typically about 0.25 to 1.5, preferably about 0.35 to 0.75 mm. PVB sheet is commercially available from Monsanto company as Saflex® sheet and E.I. duPont de Nemours and Co. as Butacite® polyvinyl butyral resin sheeting.

PVB sheet is plasticized with about 20 to 80, preferably 25 to 45 parts of plasticizer per 100 parts of PVB resin. Such plasticizers are known to those skilled in the art and are typically disclosed in U.S. Pat. No. 4,654,179, col. 5, lines 56–65, the content of which is incorporated herein by reference. Dihexyl adipate is preferred.

In addition to plasticizer(s), sheet of the invention may optionally contain additives to improve performance such as dyes, pigment colorants, light stabilizers, antioxidants, glass adhesion control agents and the like. The sheet may be provided with a colored anti-glare gradient band extending along one side adjacent its edge which may be incorporated into the sheet according to the method and system disclosed in U.S. Pat. No. 4,316,868, the content of which is incorporated herein by reference.

Figure 1:
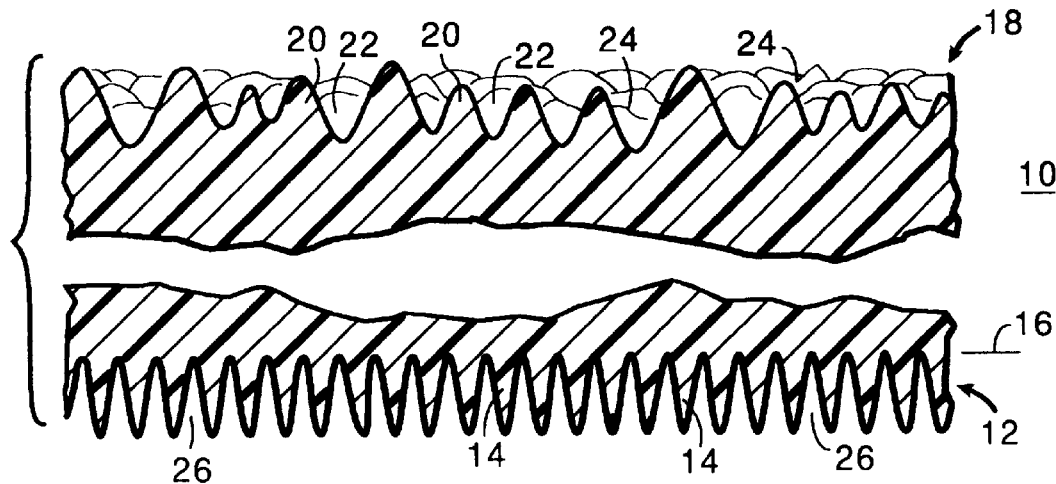
FIG. 1 is a partial, vertical, sectional view on an enlarged scale of an interlayer according to the invention.

Referring to the drawings, thermoplastic interlayer sheet 10 is depicted in FIG. 1. Interlayer 10 differs from the prior art in having different surface roughness profiles on its opposite major sides. More particularly, interlayer 10 includes a first air removal surface 12 comprising a multiplicity of microscopic embossments 14 substantially identical in shape which, in the illustrated embodiment, are V-shaped in vertical cross section when surface 12 faces downwardly. As illustrated, each embossment 14 projects from the plane of the sheet (schematically identified as 16) and forms an integral continuation of one side of interlayer 10. Embossments 14 are arranged in the regular pattern shown in FIG. 1 in the form of linear rows extending in mutually perpendicular directions on one side of interlayer 10.

Embossments 14 may differ in shape from the preferred pyramidal configuration shown. Conical, cylindrical, frustoconical and the like may alternatively be used.

Second air removal surface 18 on the other side of interlayer 10 is different from first air removal surface 12 and comprises a multiplicity of microscopic peaks 20, the surfaces of which define valleys 22, such peaks and valleys being of varying heights and depths. In contrast to first air removal surface 12, peaks 20 and valleys 22 are in an irregular, random, non-linear pattern on such other side of interlayer 10. This irregularity is schematically highlighted as 24 in FIG. 1 representing the outline of peaks of differing heights behind the plane of the cross section defining peaks 20.

The inverted V-shaped open spaces 26 between immediately adjacent embossments 14 collectively provide straight, unobstructed, relatively short, linear, uniform deair corridors to the open-ended edges of interlayer 10 through which air relatively quickly exhausts during formation of a prelaminate in a manner to be presently described. In contrast, the randomized pattern of peaks 20 and associated valleys 22 of unmodified (FIG. 1) second air removal surface 18 can be expected to clog the paths through which air passes in moving to the edges of the interlayer. More particularly, with the random pattern the exhausting air collides with the randomly oriented peaks as it moves to the periphery of the interlayer tending to lengthen the exhaust paths and incrementally extend the time for air removal in comparison with that of regular first air removal surface 12.

Surface roughness is defined by the frequency which is the number of embossments 14 or peaks 20 per unit of distance in a given direction (usually the direction of extrusion (MD) and 90° thereto (CMD)) and the amplitude or height of embossments 14 and peaks 20 which is the distance from the lowest valley to the highest peak. Techniques and systems for measuring these parameters are known to those skilled in the art and are disclosed in: U.S. Pat. No. 2,904,844, col. 3, lines 15–18; U.S. Pat. No. 3,591,406, col. 3, lines 49–53; U.S. Pat. No. 4,035,549, col. 2, lines 5–28; U.S. Pat. No. 4,925,725, col. 2, line 40 to col 3, line 47; U.S. Pat. No. 5,091,258, col. 7, lines 34–53.

The system herein to characterize roughness is a model S8P Perthomoeter from Mahr Corporation, Cincinnati, Ohio which used a tracing stylus to measure actual roughness. In this regard, $R_1$ (in microns, $\mu$), defined according to DIN 4768 (May 1990), is the average peak to valley height which is the arithmetic mean of the individual measurement lengths $l_e$ aligned together. $l_e$ can be set as desired and is 2.5 mm herein. Frequency is characterized in this system according to DIN 4762 in terms of the average distance between profile irregularities $(S_m)$ $(\mu)$ within a reference length $l_m$ wherein $l_m$ can be set as desired and is 12.5 mm herein.

Prelaminate light transmission is measured with a photometer from Tokyo Denshoku Co., or equivalent. A light transmission measurement is relative to a clear laminate obtained after autoclave bonding which is taken to be 100%.

Conventional techniques known in the art are used to produce first and second air removal surface 12, 18. First air removal surface 12 is roll molded downstream of a sheet-shaping die, not shown, by passage through a nip between two rotating rolls, i.e. an embossing roll having indentations formed in its surface which are complementarily-shaped negatives of the embossments 14 and a cooperating backup roll. An equipment system capable of modification to provide surface 12 is described in and shown in FIG. 1 of U.S. Pat. No. 4,671,913. Second air removal surface 18 is formed by controlling one or more of the following during shaping of the interlayer, usually by extrusion: polymer molecular weight distribution, water content of polymer melt, melt and die exit temperature, die exit geometry etc. Systems describing such techniques are disclosed in U.S. Pat. Nos. 2,904,844; 2,909,810; 3,994,654; 4,575,540; 5,151,234 and European Application No. 0185,863, published Jul. 2, 1986.

Figure 2:
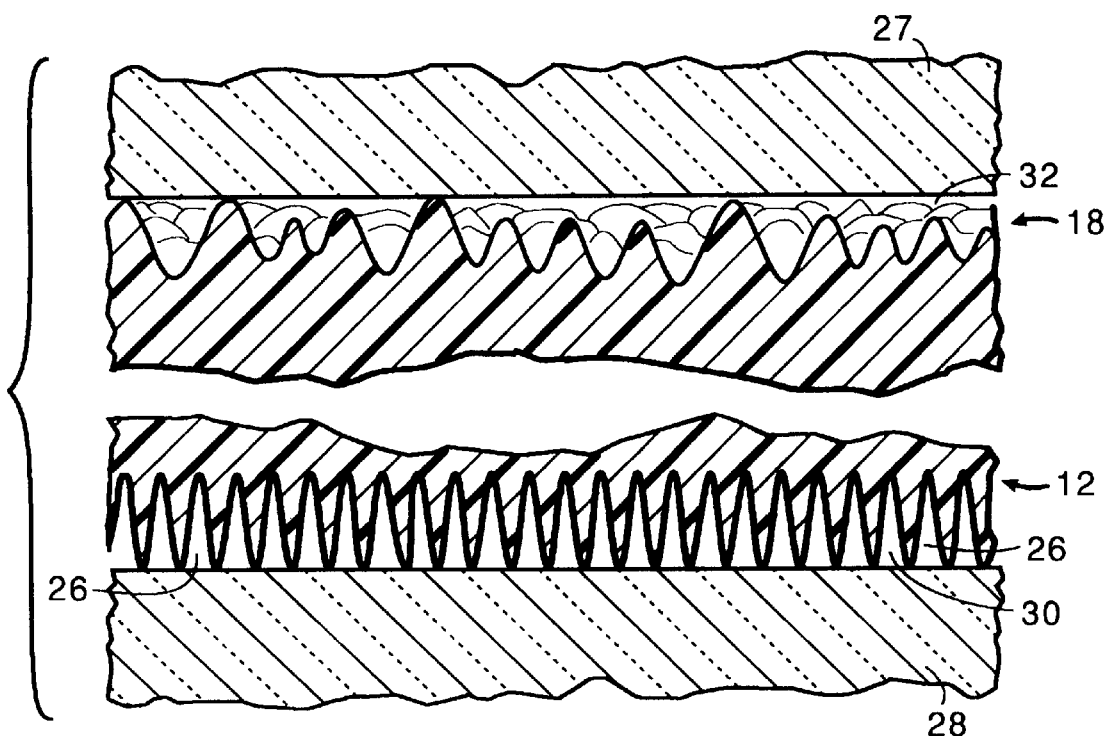
FIGS. 2 and 3 are views similar to FIG. 1 illustrating deformation of the interlayer during preparation of the prelaminate.
Figure 3:
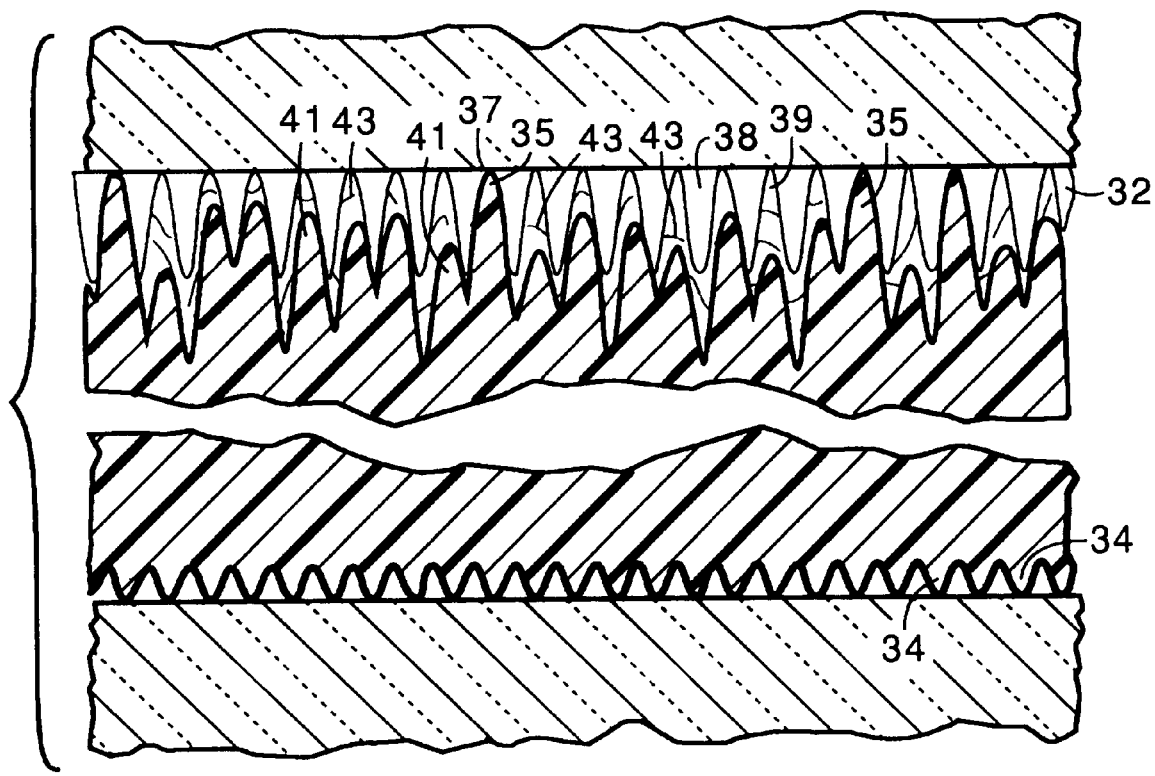

The different roughness profiles on the two sides of interlayer 10 provide an unexpected improvement in deair performance brought about by cooperative interaction of the different surface profiles. FIGS. 2 and 3 illustrate the postulated behavior of the surfaces of interlayer 10 during preparation of a prelaminate for a safety glazing. More particularly, interlayer 10 is interposed between two layers of preheated glass 27, 28 (FIG. 2). Contact with such glass conductively increases the temperature to that of the glass— i.e. to a temperature adequate to facilitate collapsible deformation of the surface, which temperature is typically above the glass transition temperature of the thermoplastic of the interlayer. The glass/interlayer/glass trilayer assembly of FIG. 2 is then placed in a flexible rubber bag or equivalent, having an opening communicating with a source of negative pressure. A vacuum ring encompassing the periphery of the trilayer assembly is an acceptable equivalent. The negative pressure draws air from interface 30 (FIG. 2) between glass sheet 28 and first air removal surface 12 at a removal rate considered greater than occurring along interface 32 between glass sheet 27 and second air removal surface 18. This difference is due to the previously described unobstructed paths for air passage between the embossments of air removal surface 12 as compared with the tortuous paths delimited by the random peaks and valleys of surface 18. Such preferential rush of air from interface 30 creates a slight negative pressure along surface 12 which partially collapses embossments 14 of first air removal surface 12 as illustrated by flattened cross section 34 in FIG. 3. This flattening is aided by the momentary greater pressure on the opposite side along interface 32 containing the randomized second air removal surface 18. Since interlayer 10 is at elevated deformation temperature and is trapped between glass layers 27, 28, the downwardly collapsing embossments 14 deflect the thermoplastic on the opposite (upper in FIG. 2) side upwardly to at least partially transfer the regular pattern to and modify the randomized pattern of second air removal surface 18. This is brought out in FIG. 3. A downwardly collapsing regular embossment 14 on the lower surface will cause upward deflection of a particular random peak on the upper surface, which peak is of sufficient initial height such that on deflecting it becomes high enough to abut against the glass surface. This is depicted by modified peak 35 in the plane of FIG. 3 abutting glass surface 37. Other modified peaks behind the plane of FIG. 3 generated the same way as 35 are shown as 39 and this represents the regular pattern superimposed on the initial random surface. However, random peaks of upper surface 18 of lesser initial height than just described continue to provide a random pattern in modified surface 18 and these are identified in the plane of FIG. 3 as 41. 43 in FIG. 3 schematically represents modified peaks of such initial lesser height behind the plane of FIG. 3. Paths 38 of the thus modified second air removal surface 18 formed by the transferred regular pattern from the opposite side are considered to facilitate flow of air from interface 32 of the modified second air removal surface. This effect of introducing an array of regular peaks from the regular pattern to a previously entirely random surface results in shorter, less tortuous air escape paths. Air flow through the modified random pattern is similar to that occurring on the side with the regular pattern and is considered less obstructed than that occurring through the unmodified random pattern.

Subsequently increasing the temperature of the glass/interlayer/glass assembly of FIG. 3 in an oven or equivalent substantially completely collapses the embossments and peaks of the first and modified second air removal surfaces of interlayer 10 and press bonds the interlayer to the glass to provide the prelaminate. Subjecting such prelaminate to conventional bonding conditions of elevated temperature and pressure, in a manner known to those in the art usually in a downstream autoclave, firmly bonds the opposing surfaces of the interlayer 10 to the contiguous glass layers to form the finished safety glass assembly.

The invention is further described in the following examples which are for illustration only and not to limit or restrict the invention.

EXAMPLE C 1

This is not according to the invention.

Thirty mils (0.76 mm) thick Saflex® sheet containing a nominal level of 32 parts plasticizer per 100 parts PVB resin is obtained from Monsanto Company having a surface roughness on each side characterized by values of $R_z$ of 30–35 microns and $S_m$ of 450–500 microns. The pattern is random as illustrated at 18 in FIG. 1. Such roughness profile is generated by melt fracture, typically by passage of the thermoplastic forming the sheet through a rectangular sheeting die opening formed by lands which are at a temperature less than that of the bulk of the extruding melt. This is achieved by flow of an appropriate temperature conditioning fluid through channels just below the land surfaces.

40×60 in (102×154 cm) sections of such sheet are placed on a heating surface at 80–180° F. (26 to 82° C.) to heat the sections to this temperature. An embossing station comprises a 4 inch (10 cm) diameter embossing roll pressing against a 4 inch (10 cm) diameter rubber-faced backup roll at a pressure of 30 pounds per lineal inch. The entire surface of the embossing roll has sharply profiled abutting pyramidal cavities forming a retiform surface thereon at a frequency of 88 cavities per inch. The face of the back up roll is covered with a high extensibility, temperature resistant rubber chosen to be capable of stretching without fracturing. An anti-stick release coating is on the surface of the embossing roll which is at 177° C. The embossing roll rotates at a surface speed of about 10–20 fpm (3–6 m per min.). A vacuum roll adjacent the nip formed by the embossing and back up rolls pulls the embossed sheet from the embossing roll surfaces The precut sheet sections are passed through the nip, removed by the vacuum roll beyond the nip and placed on a table at room temperature. Each sheet section is then turned over and the process repeated to emboss the other side.

Sheet sections sharply embossed on each side with a regular pattern in the manner just described are visually displeasing to the eye and therefore considered commercially unacceptable. The appearance is described as a moire pattern and is caused by the frequency of the embossments not being in exact accurate register on each side of the sheet—i.e. the slightly different frequency on each side results in interference patterns which are not in phase with each other. Sheet with such moire effect presents an undulating pattern similar to a wood grain appearance.

Using the roughness measuring system previously described, the sheet was characterized by an $R_z$ of 30 microns and $S_m$ of 280 microns.

EXAMPLE C 2

This likewise is not according to the invention.

Unembossed Saflex sheet as initially described above having a random roughness surface profile on each side ($R_z$=30–35 microns and $S_m$=450–500 microns) is cut into sections as in Example C 1. Sheet sections at about 15–18° C. are placed between two layers of similarly dimensioned float glass at about 30° C. to raise the sheet to this temperature which is above the glass transition temperature of the plasticized PVB. The three layer glass/sheet/glass assembly is placed in a flexible rubber bag connected to a negative pressure source to develop a pressure of ⅓ atmosphere (33.5 k Pa) within the bag thereby drawing air from the two interfaces of the sheet with the glass. The three layer assembly is then passed through an oven to raise the temperature of the three layers to about 100° C. and then removed from the oven and cooled to room temperature. Percent light transmission of the prelaminate thus formed is measured as 69–70%. Such a laminate is industrially unacceptable since at least 85% is required to be commercially viable. This control Example illustrates unacceptable performance of a surface roughness profile in the form of a random pattern on each side of the sheet.

EXAMPLE C 3

A commercially available plasticized PVB sheet different from that of the invention has a random pattern on each side similar to that described in Example C 2 except $R_z$ is 34 microns and $S_m$ 291 microns. A prelaminate formed using the procedure described in Example C 2 has a light transmission of 85–87%.

EXAMPLE 1

This is according to the invention.

Sheet sections as described in. Example C 1 are embossed using the procedure of C 1 on only one side—i.e. the second side is not embossed and has the initially present randomized pattern having $R_z$ of 30–35 microns and $S_m$ of 450–500 microns. As in C 1, the regular roughness profile of the embossed side has $R_z$ of 30 and $S_m$ of 280 microns.

Measured light transmission in (4–6 samples) prelaminates formed therewith is as high as 95% and is generally in the 87–95% range. This unexpectedly high light transmission obtained using interlayer having different roughness profiles on each side is the result of the mechanism previously described with reference to FIGS. 2 and 3. This is contrasted with the lower light transmission in Examples C 2 and C 3 where the interlayer sheet has a random roughness pattern on each side.

Interlayer of the present invention preferably has an $R_z$ on each side of between 20–40 microns and a frequency on each side as characterized by $S_m$ of less than about 300 microns, preferably between 80 and 300 microns.

The preceding description is for illustration and should not be taken as limiting. Various modifications and alterations will be readily suggested to persons skilled in the art. It is intended, therefore, that the foregoing be considered as exemplary only and that the scope of the invention be ascertained from the following claims.

What is claimed is:

1. In the method of preparing a prelaminate for a safety glazing by deairing the interface with glass on each rough-surfaced side of a thermoplastic interlayer and heating the interlayer and glass to collapse the rough surfaces, the improvement facilitating deairing wherein a regular roughness pattern on one side of the interlayer is partially transferred to and imposed on a random roughness pattern on the other side of the interlayer to provide deair paths which are less obstructed than those of the unmodified random pattern, thereby providing a prelaminate capable of transmitting at least 85% of light incident thereon.

2. A method of preparing a prelaminate for a safety glazing which comprises:

a) providing a thermoplastic interlayer having:
   i) a first air removal surface comprising a multiplicity of microscopic embossments of substantially identical shape integrally projecting from the plane of one side of the interlayer in a regular pattern of rows; and
   ii) a second air removal surface on the other side of the interlayer which is different from the first air removal surface, and comprises a multiplicity of microscopic peaks and valleys of varying heights and depths arranged in an irregular, non-linear pattern;

b) interposing the interlayer between two layers of glass;

c) increasing the temperature of the interlayer between the glass layers to above the glass transition temperature of the thermoplastic;

d) developing a negative pressure on the assembly of c) to draw air from the interface between one glass sheet and the first air removal surface at a rate greater than occurring at the interface between the other glass sheet and the second air removal surface;

e) partially collapsing embossments of the first air removal surface to cause the regular pattern of such first air removal surface to partially transfer to and modify the second air removal surface thereby facilitating air removal from the interface of the modified second air removal surface through channels formed by the transferred regular patten of the modified second air removal surface; and then f) increasing the temperature of the assembly of e) to substantially completely collapse the embossments and peaks of the first and modified second air removal surfaces of the interlayer to provide said prelaminate capable of transmitting at least 85% of light incident thereon.

* * * * *